(12) United States Patent
Takigawa (10) Patent No.: US 9,081,720 B2
(45) Date of Patent: Jul. 14, 2015

(54) INFORMATION PROCESSING APPARATUS, SETTING INFORMATION MANAGEMENT METHOD AND RECORDING MEDIUM

(71) Applicant: Minako Takigawa, Tokyo (JP)

(72) Inventor: Minako Takigawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/108,413

(22) Filed: Dec. 17, 2013

(65) Prior Publication Data

US 2014/0189170 A1  Jul. 3, 2014

(30) Foreign Application Priority Data

Dec. 27, 2012 (JP) .................................. 2012-285039

(51) Int. Cl.
*G06F 3/00* (2006.01)
*G06F 13/12* (2006.01)
*G06F 9/445* (2006.01)

(52) U.S. Cl.
CPC ............ *G06F 13/12* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 6,700,674 B1* | 3/2004 | Otsuka et al. | 358/1.15 |
| 8,255,914 B1* | 8/2012 | Joyce et al. | 718/103 |
| 2001/0015817 A1* | 8/2001 | Adachi | 358/1.13 |
| 2007/0273922 A1* | 11/2007 | Matsugashita | 358/1.15 |
| 2008/0066072 A1* | 3/2008 | Yurekli et al. | 718/104 |
| 2010/0046048 A1* | 2/2010 | Uotani et al. | 358/527 |
| 2012/0050794 A1* | 3/2012 | Ikeda | 358/1.15 |
| 2012/0147399 A1* | 6/2012 | Uotani et al. | 358/1.9 |
| 2012/0224207 A1* | 9/2012 | Sueshige | 358/1.13 |

FOREIGN PATENT DOCUMENTS

| | | |
|---|---|---|
| JP | 2006-139603 | 6/2006 |
| JP | 2010-208170 | 9/2010 |

* cited by examiner

*Primary Examiner* — Michael Sun
(74) *Attorney, Agent, or Firm* — Harness, Dickey & Pierce (57) ABSTRACT

An disclosed information processing apparatus includes a memory unit for storing first setting-values for setting-items for a program in accordance with multiple priority levels, a given one of the setting-items being for one or more of the first setting-values, and each of the first setting-values having one of the priority levels assigned thereto; a setting information management unit for obtaining the first setting-values from the memory unit, and creating second setting-values by selecting, as one of the second setting-values, one of the first setting-values for any given setting-item from the first setting-values for the given setting-item such that the one of the first setting-values selected for the given setting-item has a highest priority level among the first setting-values for the given setting-item; and a program management unit for starting the program that operates based on the created second setting values.

20 Claims, 10 Drawing Sheets

| SETTING ITEM | SETTING VALUE |
| --- | --- |
| SETTING 1 | 100 |
| SETTING 3 | aaaaa |
| SETTING 4 | bbbbb |

FIG.7B

| SETTING ITEM | SETTING VALUE |
| --- | --- |
| SETTING 1 | 200 |
| SETTING 2 | ABCDE |
| SETTING 6 | XYZ |

FIG.7C

| SETTING ITEM | SETTING VALUE |
| --- | --- |
| SETTING 1 | 300 |
| SETTING 5 | 1 |
| SETTING 6 | MMM |

FIG.8

| SETTING ITEM | SETTING VALUE |
| --- | --- |
| SETTING 1 | 100 |
| SETTING 2 | ABCDE |
| SETTING 3 | aaaaa |
| SETTING 4 | bbbbb |
| SETTING 5 | 1 |
| SETTING 6 | XYZ |

| SETTING ITEM | SETTING VALUE | PRIORITY INFORMATION |
|---|---|---|
| SETTING 1 | 100 | Priority A |
| SETTING 2 | ABCDE | Priority B |
| SETTING 3 | aaaaa | Priority A |
| SETTING 4 | bbbbb | Priority A |
| SETTING 5 | 1 | Priority C |
| SETTING 6 | XYZ | Priority B |

FIG.11

APPLICATION 1 SETTING CHANGE

SETTING 1: 100
SETTING 2: ABCDE
SETTING 3: aaaaa ▼
SETTING 4: bbbbb ▼
SETTING 5: 1
SETTING 6: XYZ OK    Cancel

| SETTING ITEM | SETTING VALUE |
|---|---|
| SETTING 1 | 200 |
| SETTING 2 | ABCDE |
| SETTING 5 | 3 |
| SETTING 6 | XYZ |

FIG.13

INFORMATION PROCESSING APPARATUS, SETTING INFORMATION MANAGEMENT METHOD AND RECORDING MEDIUM

BACKGROUND OF THE INVENTION

1. Field of the Invention

The disclosures herein generally relate to an information processing apparatus, a setting information management method and a recording medium.

2. Description of the Related Art

A print control method has been known in which, in order to provide a print environment that is effective for reducing operational costs of a printing apparatus without greatly changing the print settings of the print data set by a user, predetermined priorities are set for multiple setting items of the print settings and at least one of the multiple setting items of the print settings set by the user at the time of printing of the print data is changed according to the predetermined set priorities (refer to, for example, Patent Document 1).

An information processing apparatus such as a PC (Personal Computer) or a server apparatus performs a process defined in advance by a program. The information processing apparatus may be able to change the contents of the process (operation of the program) according to the situation. The information processing apparatus reads setting values (or properties) from outside the program and changes the operation according to the setting values. In this kind of information processing apparatus which changes the operation according to the setting values, the user-friendliness has been improved by allowing the setting values to be changed by the user according to the user environment.

In this kind of information processing apparatus which changes the operation according to the setting values, not only the user but also, for example, an administrator may have a request for controlling the setting values. There is a problem that in this kind of information processing apparatus which changes the operation according to the setting values, it cannot handle the request from a person who is not the user, for example, an administrator, for controlling the setting values.

[Patent Document 1] Japanese Patent Application Publication No. 2006-139603

SUMMARY OF THE INVENTION

It is a general object of at least one embodiment of the present invention to provide an information processing apparatus, a setting information management method and a recording medium in which an administrator can easily perform the management of the setting values that determine the operation of the program.

In one embodiment, an information processing apparatus is disclosed. The information processing apparatus includes a memory unit configured to store first setting values associated with setting items for a program in accordance with multiple priority levels, a given one of the setting items being associated with one or more of the first setting values, and each of the first setting values having one of the priority levels assigned thereto; a setting information management unit configured to obtain the first setting values from the memory unit, and to create second setting values for the program by selecting, as one of the second setting values, one of the first setting values for any given setting item from one or more of the first setting values associated with the given setting item such that the one of the first setting values selected for the given setting item has a highest priority level among the one or more of the first setting values associated with the given setting item; and a program management unit configured to start the program that operates based on the created second setting values.

According to the present embodiment, it becomes easy for the administrator to control the setting values that determine the operation of the program.

BRIEF DESCRIPTION OF THE DRAWINGS

Other objects and further features of embodiments will become apparent from the following detailed description when read in conjunction with the accompanying drawings.

DESCRIPTION OF THE PREFERRED EMBODIMENTS

In the following, embodiments of the present invention will be described with reference to the accompanying drawings.

[First Embodiment]

<System Configuration>

Figure 1:
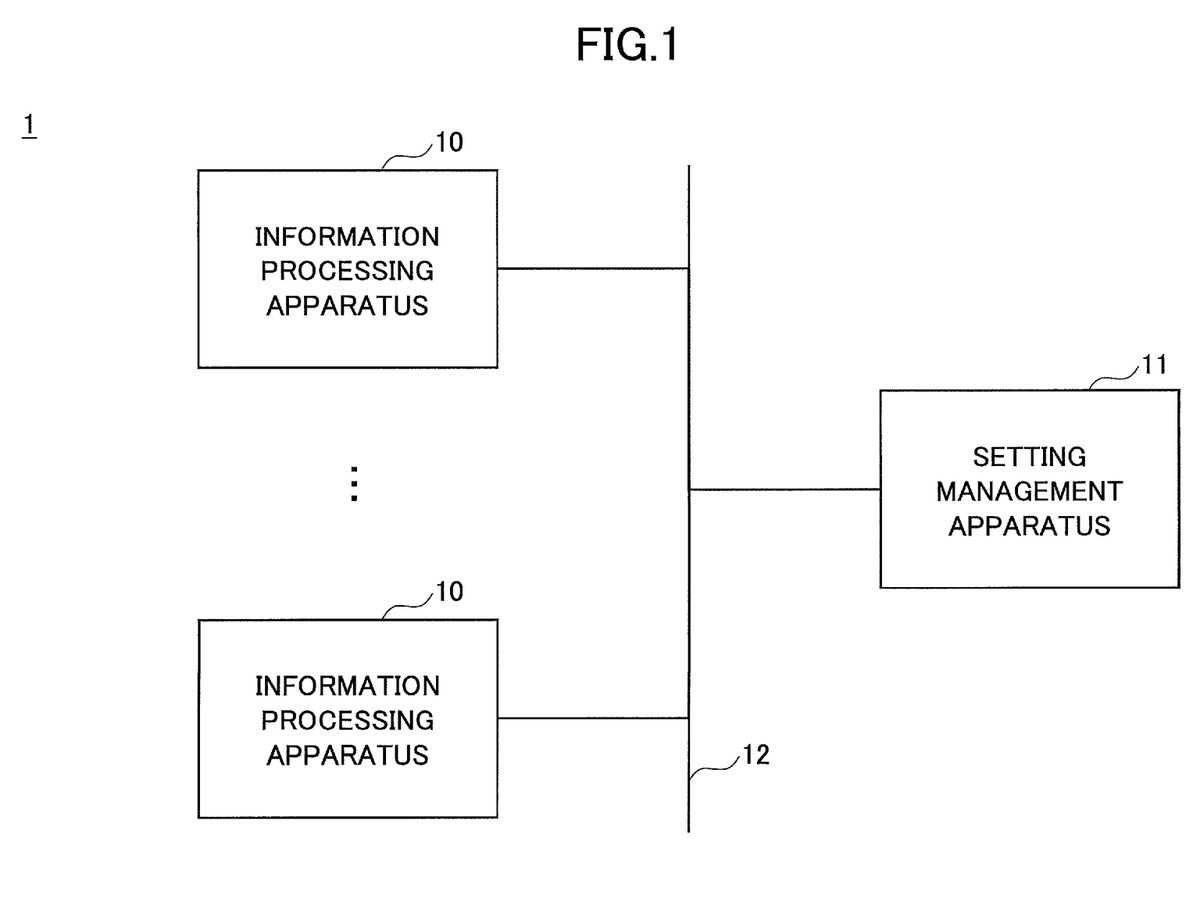
FIG. 1 is a drawing illustrating a configuration example of an information processing system according to the present embodiment.

FIG. 1 is a drawing illustrating a configuration example of an information processing system 1 according to the present embodiment. In the information processing system 1 of FIG. 1, an information processing apparatus 10 and a setting management apparatus 11 are connected to each other via a network 12 such as the Internet or a LAN, and are capable of data communications.

The information processing apparatus 10 is, for example, a client terminal or a portable terminal. The information processing apparatus is a terminal apparatus a user can operate such as a PC on which a general OS is installed, a smart phone, a portable telephone, etc. The information processing apparatus 10 includes a wireless communication unit or a wired communication unit. The information processing apparatus 10 includes an input unit such as a keyboard or a mouse and an output unit such as a display unit, and runs one or more application programs on the OS.

The setting management apparatus 11 is a server apparatus on which a general server OS is installed. The setting management apparatus 11 includes a wireless communication unit or a wired communication unit. The setting management apparatus 11 includes an input unit such as a keyboard or a mouse and an output unit such as a display unit. The setting management apparatus 11 is implemented by, for example, a file server. Note that the existence of the setting management apparatus 11 is not essential. The administrator only needs a unit which can be used for distributing the setting information to each of the information processing apparatuses 10 for the update.

The network 12 is used for information exchange between the information processing apparatus 10 and the setting management apparatus 11. Apparatuses such as a router or a firewall may be placed between them. In FIG. 1, as an example, multiple information processing apparatuses 10 and one setting management apparatus 11 are shown. There may be one information processing apparatus 10 and multiple setting management apparatuses 11.

<Hardware Configuration>

Figure 2:
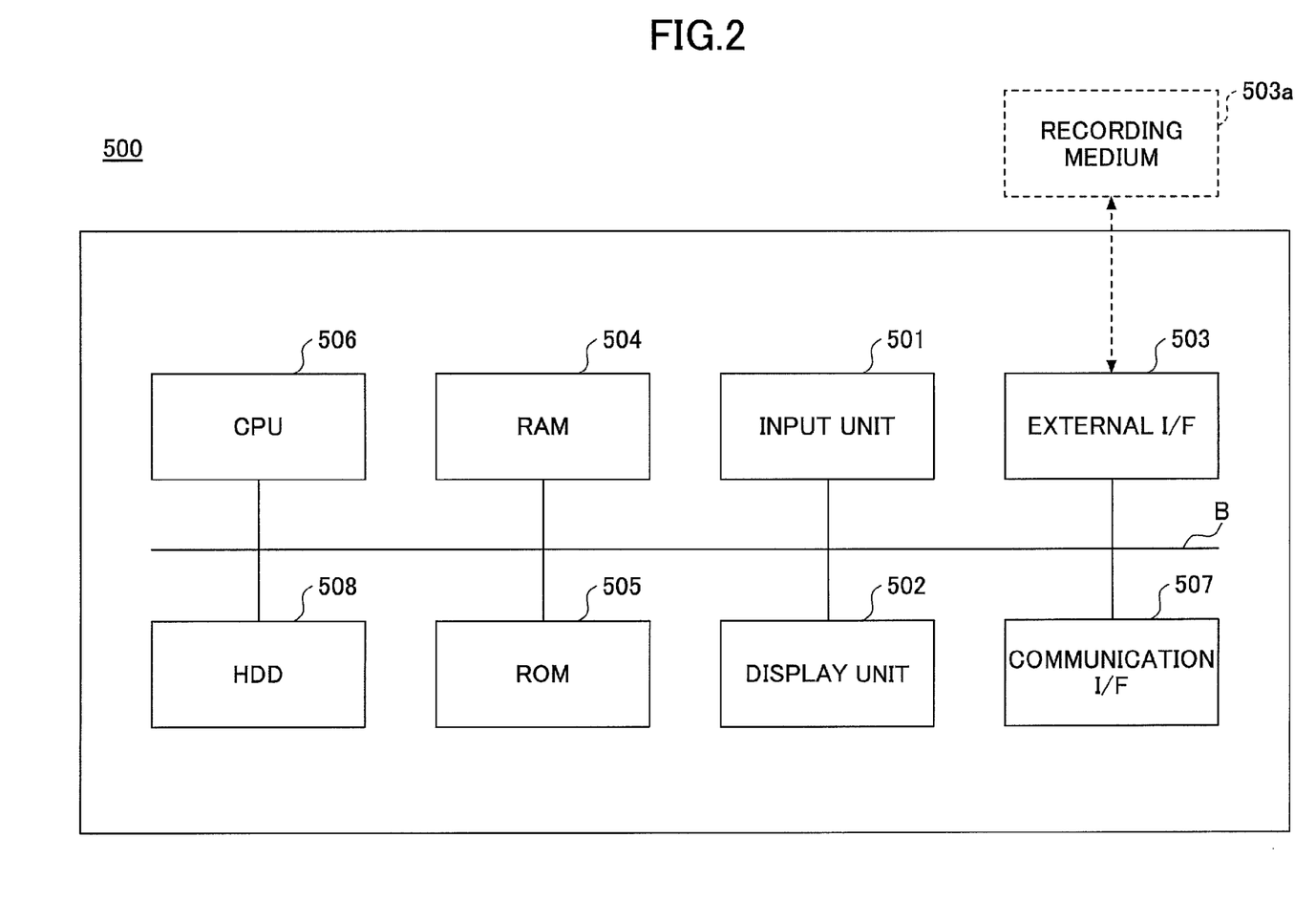
FIG. 2 is a hardware configuration example of a computer according to the present embodiment.

The information processing apparatus 10 and the setting management apparatus 11 are implemented by, for example, PCs with a hardware configuration as shown in FIG. 2.

FIG. 2 is a hardware configuration example of a PC 500 according to the present embodiment. The PC 500 shown in FIG. 2 includes an input unit 501, a display unit 502, an external I/F 503, a RAM (Random Access Memory) 504, a ROM (Read-Only Memory) 505, a CPU (Central Processing Unit) 506, a communication I/F 507 and an HDD (Hard Disk Drive) 508, which are connected to each other by a bus B.

The input unit 501 includes a keyboard, a mouse, a touch panel, etc., and is used for a user to input operation signals. The display unit 502 includes a display device and is used for displaying a result of a process by the PC 500.

The communication I/F 507 is an interface for the PC 500 to connect to the network 12. The PC 500 can perform data communications through the communication I/F 507.

The HDD 508 is a non-volatile memory unit in which programs and data are stored. The stored programs and data include, for example, an OS (Operating System), which is basic software for controlling the PC 500 as a whole, and application programs, which provide various kinds of functions on the OS. The HDD 508 manages stored programs and data by using a predefined file system and/or a DB (Database).

The external I/F 503 is an interface to an external unit. The external unit includes a recording medium 503a, etc. The PC 500 can read and write the recording medium 503a through the external I/F 503. The recording medium 503a includes a flexible disk, a CD (Compact Disk), a DVD (Digital Versatile Disk), an SD memory card, a USB memory (Universal Serial Bus memory), etc.

The ROM 505 is a non-volatile semiconductor memory (memory unit) which can retain programs and data even when the power supply is disconnected. In the ROM 505, programs and data such as a BIOS (Basic Input/Output System) which runs at the start-up of the PC 500, OS settings, network settings, etc., are stored. The RAM 504 is a volatile semiconductor memory (memory unit) which temporarily stores programs and data.

The CPU 506 is a computing unit for performing overall control and functions of the PC 500 by reading programs and data from the memory unit such as the ROM 505 or the HDD 508 into the RAM 504 and by performing processes. The information processing apparatus 10 and the setting management apparatus 11 are implemented by PCc 500 in terms of hardware and are capable of performing various processes which will be described later.

<Software Configuration>

<<Information processing apparatus 10>>

Figure 3:
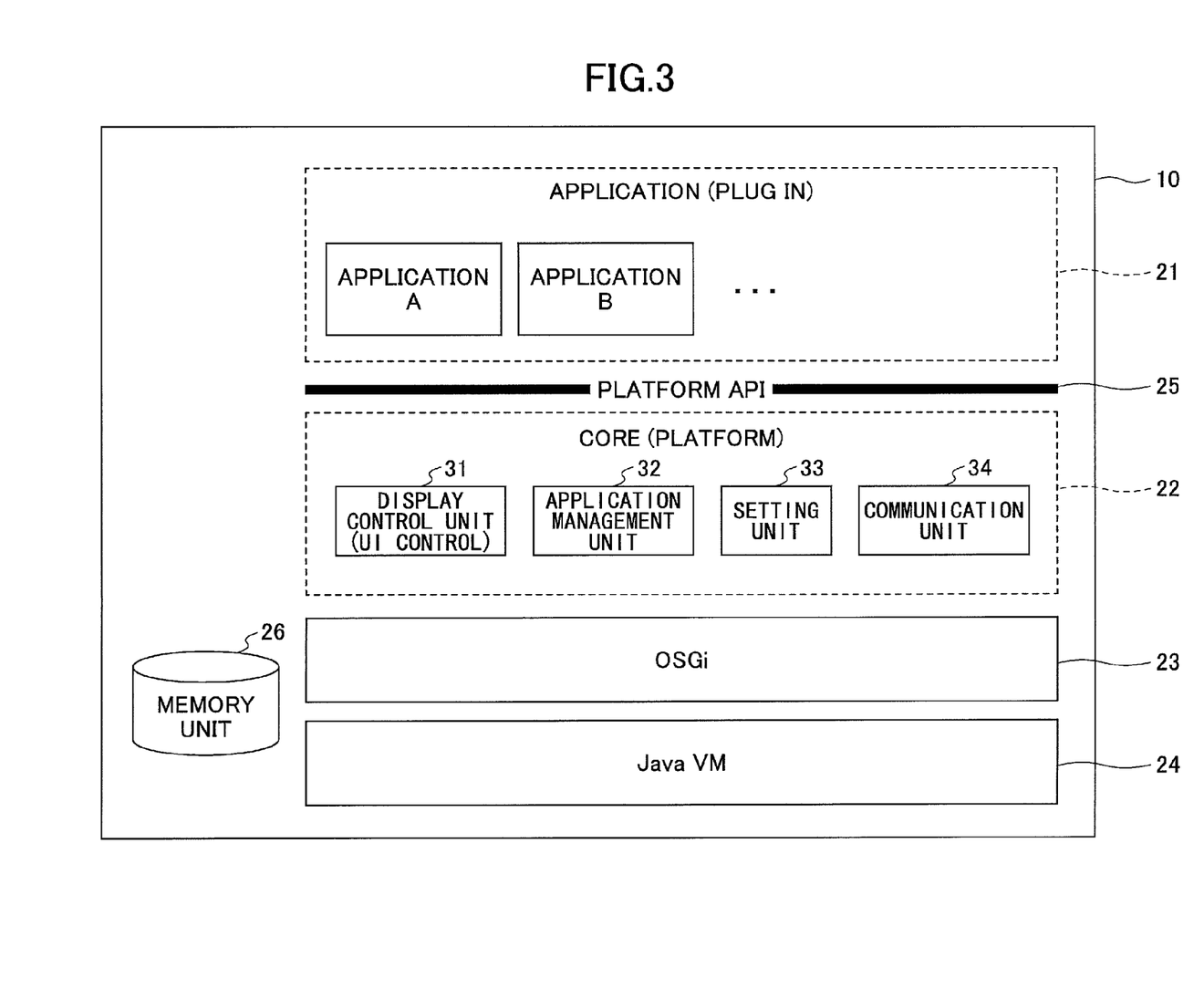
FIG. 3 is an example of a process block diagram of an information processing apparatus.

The information processing apparatus 10 according to the present embodiment is implemented by, for example, process blocks shown in FIG. 3. FIG. 3 is an example of a process block diagram of the information processing apparatus 10.

The information processing apparatus 10 in FIG. 3 implements an application (plug-in) 21, a platform (core) 22, an OSGi (Open Service Gateway Initiative) 23, a Java VM 24, a platform API (Application Programming Interface) 25, and a memory unit 26, by executing programs.

The application 21 is a program for a user to perform various processes on the information processing apparatus 10. The application 21 operates while it is monitored by an application management unit which will be described later. The process contents of the application 21 are not limited to specific contents. The application 21 performs general PC processing such as creating documents, browsing, image processing, etc. Note that in FIG. 3, an application A and an application B are shown as examples of the applications 21.

The platform API 25 is an interface for the application 21 to use the platform 22. The platform API 25 is a predefined interface for the platform 22 to receive a request from the application 21, and consists of functions, classes, etc.

Also, the platform 22 includes a display control (UI control) unit 31, an application management unit 32, a setting unit 33 and a communication unit 34. The display control unit 31, for example, controls the display of the display unit 502 based on the request from the application 21. The application management unit 32 manages the application 21. The application management unit 32 also manages operational settings of the application 21 in addition to starting, ending, and installing/uninstalling/updating the application 21.

The setting unit 33 performs processes related to setting information, including managing setting information, updating setting information, and receiving setting information from the setting management apparatus 11. Note that the details of the setting unit 33 will be described later. The communication unit 34 performs communications with the setting management apparatus 11.

The OSGi 23 is a base system (OSGi framework) for managing the dynamic addition or the execution of plug-ins (Java modules). The Java VM (Virtual Machine) is an execution environment for the plug-ins. Note that the OSGi 23 and Java VM 24 are known technologies and the detailed description will be omitted. The memory unit 26 stores necessary information for the information processing apparatus 10 such as setting information.

Figure 4:
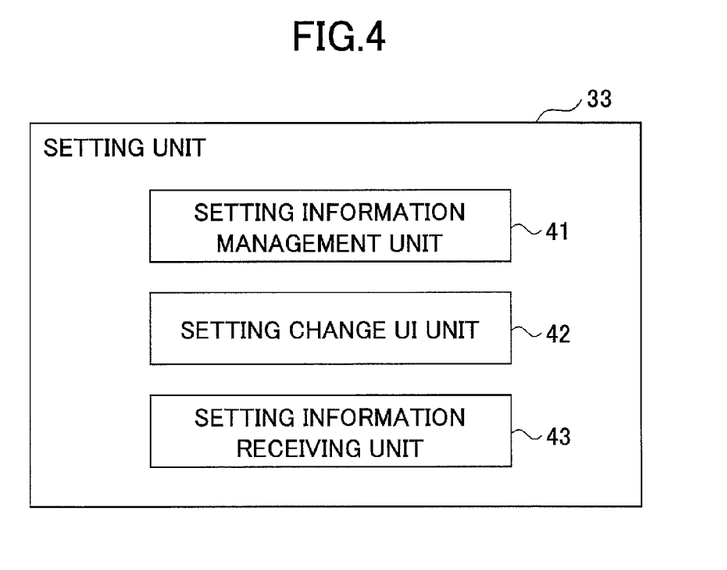
FIG. 4 is an example of a process block diagram of a setting unit.

The setting unit 33 is implemented by, for example, process blocks shown in FIG. 4. FIG. 4 is an example of a process block diagram of the setting unit 33. The setting unit 33 in FIG. 4 includes a setting information management unit 41, a setting change UI unit 42 and a setting information receiving unit 43.

The setting information management unit 41 manages setting information of the application 21. The setting information management unit 41 reads setting values for each of the applications 21 from the memory unit 26 and transmits them to the application 21 through the application management unit 32. Also, the setting information management unit 41 exchanges setting information with the setting change UI unit 42 and the setting information receiving unit 43, and updates the setting information stored in the memory unit 26.

The setting change UI unit 42 receives the setting information from the setting information management unit 41, displays the setting information on, for example, the display unit 502, and presents the setting information to the user. Also, the setting change UI unit 42, for example, receives a change to the setting information from the user through the input unit 501 and transmits the change of the setting information to the setting information management unit 41.

Note that the setting change UI unit 42 determines whether or not it receives a change to the setting information from the user based on the property of the setting information received from the setting information management unit 41. In the case where the setting change UI unit 42 does not receive the change to the setting information from the user, the setting change UI unit 42, after processing the setting information in such a way that the setting information cannot be modified on the UI, displays the setting information.

The setting information receiving unit 43 obtains the setting information from the setting management apparatus 11 through the communication unit 34, and transmits the setting information to the setting information management unit 41. Note that the setting information receiving unit 43 is not always necessary, however it becomes necessary in the case where the setting management apparatus 11 distributes the setting information.

The information processing apparatus 10 in FIG. 3 concentrates its processes by concentrating functions commonly used by multiple applications (plug-ins) 21 to the platform 22. Note that the classification structure of the process block diagram in FIG. 3 is just an example. It is not always necessary that the process block diagram be classified in layer structure as shown in FIG. 3.

<<Setting Management Apparatus 11>>

Note that the process blocks of the setting management apparatus 11 are omitted. The setting management apparatus 11 puts the setting information for distribution in a predefined location so that the setting information for distribution can be located from the information processing apparatus 10 through the network 12.

<Process Details>

In the following, the process details of the information processing apparatus 10 according to the present embodiment will be described.

<<Start-Up Process of the Application 21>>

Figure 5:
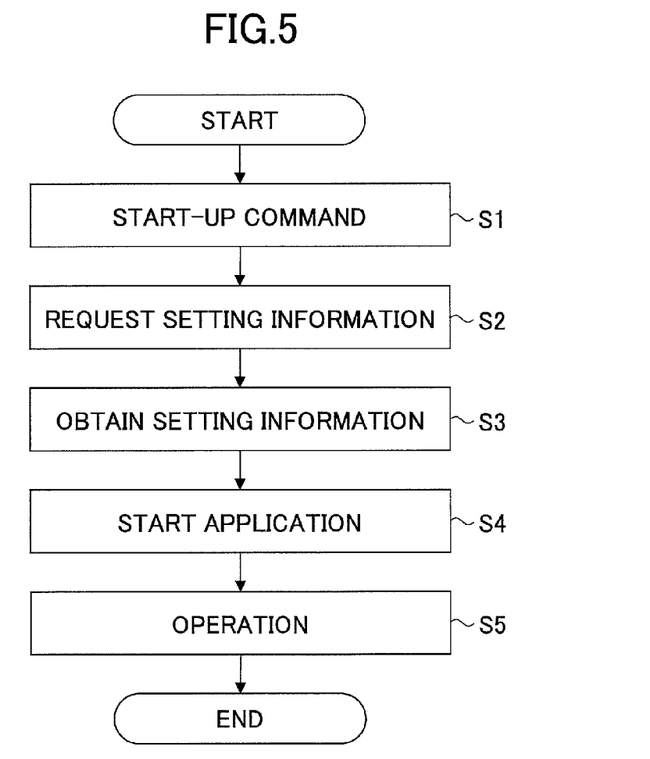
FIG. 5 is an example of a flowchart illustrating a procedure of a start-up process.

FIG. 5 is an example of a flowchart illustrating the procedure of the start-up process. In step S1, a start-up command for the application 21 is transmitted to the application management unit 32 from, for example, the user or the OS. For example, in the case where the user needs to start the application 21, the user initiates the start-up command for the application 21. Also, in the case where the application 21 is resident software and it is necessary for the OS to automatically start the application 21 during the start-up of the OS, the OS initiates the start-up command for the application 21.

In step S2, the application management unit 32 performs start-up initialization for the application 21 which is specified by the start-up command. During the start-up initialization, the application management unit 32 requests from the setting information management unit 41 of the setting unit 33, the setting information, which is necessary for the start-up of the specified application 21.

In step S3, the setting information management unit 41 reads the setting information of the specified application 21 from the memory unit 26. At this time, the setting information management unit 41, as will be described later, obtains multiple items of setting information with different priorities. The setting information management unit 41, among the setting values included in the multiple items of the setting information with different priorities, upon adopting the setting values included in the setting information with the higher priority as effective setting values, creates the setting information which will be transmitted to the application 21.

Note that the detailed process in which the setting information to be transmitted to the application 21 in step S3 will be described later. the setting information management unit 41 transmits the created setting information to the application management unit 32.

In step S4, the application management unit 32 starts the application 21 while transmitting to the application 21 the setting information obtained from the setting information management unit 41. In step S5, the started application 21 reads the transmitted setting information and starts operations according to the setting information.

Note that the setting information can be any information as long as it determines the operation of the application 21. Examples of the setting value are a setting value of print properties (color/monochrome, single-face/double-face, etc.,) enabling/disabling a plug-in, source locations of setting files, etc.

<<Process Details of Step S3>>

Figure 6:
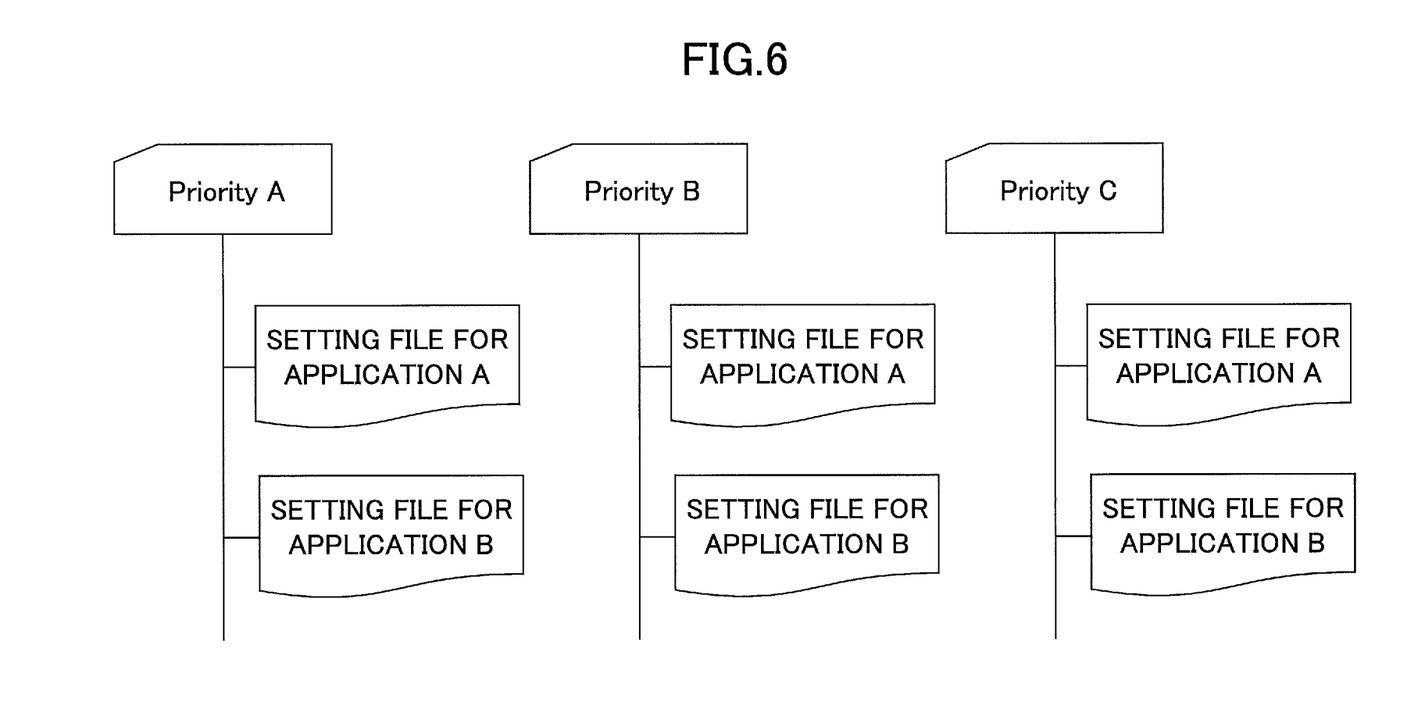
FIG. 6 is a drawing illustrating a configuration example of setting information stored in a memory unit.

Here, operations in step S3 of FIG. 5 will be further described in detail. For example, as shown in FIG. 6, the setting information for each of the applications 21 is stored in the memory unit 26 which is divided according to the priorities. The setting information is stored in the form of a file. The setting information of an application 21 with a certain priority forms one setting file. FIG. 6 is a drawing illustrating a configuration example of the setting information stored in the memory unit 26.

In FIG. 6, the setting information of the application A is shown as a setting file of the application A. Also, in FIG. 6, the setting information of the application B is shown as a setting file of the application B.

The setting files of multiple applications 21 are grouped according to priority and stored in the folder (directory) of the priority. FIG. 6 shows an example in which the setting files of the application A and the setting files of the application B are grouped according to priority and stored in the folders of priority A, B and C.

Note that the location relationship among the folders of different priorities is not specifically specified. They may be randomly located or may be located under a specific parent folder (parent directory).

In a setting file of an application 21, setting information which is necessary for the application 21 is stored. In the case where setting files of different priorities exist, it is not necessary for all setting files to include all setting values as long as each of the setting values exists in at least one setting file. Note that in the case where the application 21 can operate without a certain setting value, it is an acceptable situation that the setting value does not exist in any of the setting files.

Figure 7A:
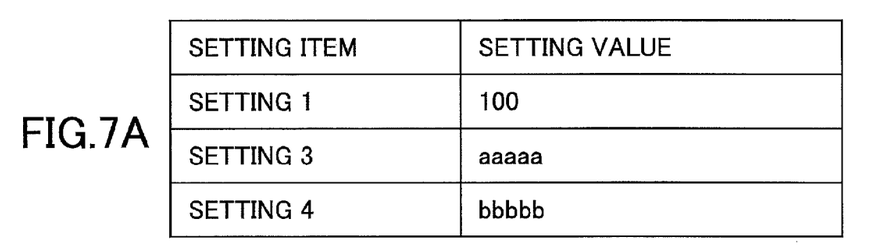
FIGS. 7A through 7C are drawings illustrating contents of setting files.
Figure 7B:
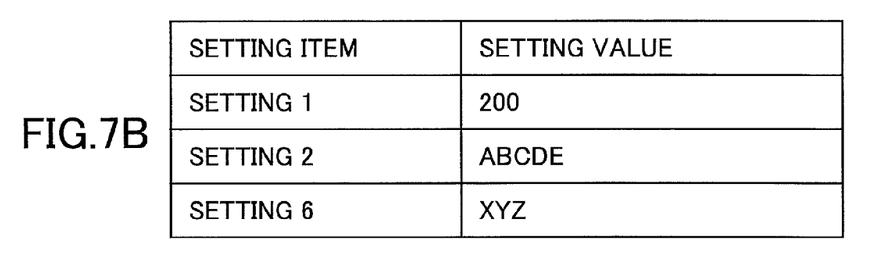
Figure 7C:
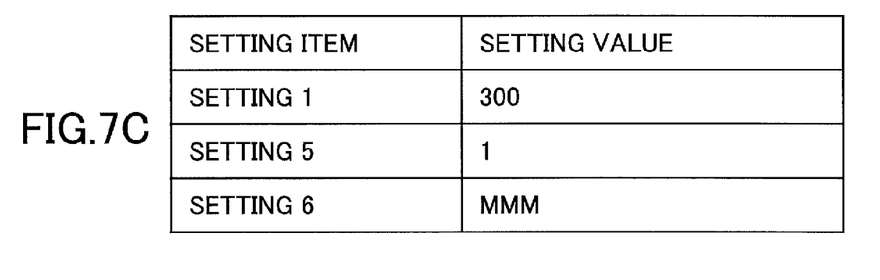

FIGS. 7A through 7C are drawings illustrating the contents of setting files. FIGS. 7A through 7C show examples in which the setting items, which are necessary for the application 21, are "setting 1" through "setting 6". It is assumed that in the setting files of the priorities (Priorities A through C), the setting information shown in FIG. 7A through FIG. 7C is included.

FIG. 7A is the contents of the setting file of priority A. FIG. 7B is the contents of the setting file of priority B. FIG. 7C is the contents of the setting file of priority C. In the case where the setting information is represented by a file, the setting items and the setting values are indicated by character strings.

The setting value takes a necessary form (character strings, number value, truth-value, etc.,) that is required by the application 21.

Figure 8:
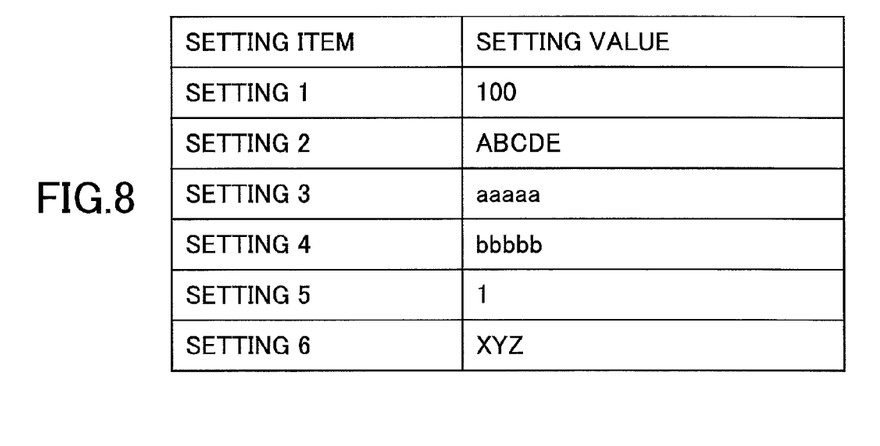
FIG. 8 is a drawing illustrating contents of a created setting file.

In the case where there are setting files shown in FIGS. 7A through 7C and the priorities of the setting files are defined in advance as Priority A→Priority B→Priority C, the setting information management unit 41 creates the setting information including the setting values as shown in FIG. 8 because the setting information management unit 41 adopts the setting information with the higher priority as effective setting information. FIG. 8 is a drawing illustrating the contents of the created setting file.

In other words, as shown in FIG. 8, the setting information management unit 41 adopts the setting values which exist in the setting file of Priority A as effective setting values. Then the setting information management unit 41 adopts the setting values which exist in the setting file of Priority B and does not exist in the setting file of priority A. And then, finally, the setting information management unit 41 adopts the setting values which exist in the setting file of Priority C and does not exist in the setting files of priority A and B.

For example, even when a setting value exists in the setting file of Priority B or C, if the setting value exists in the setting file of Priority A, then the setting information management unit 41 adopts the setting value which exists in the setting file of Priority A. Also, even when a setting value exists in the setting file of Priority C, if the setting value exists in the setting file of Priority B, then the setting information management unit 41 adopts the setting value which exists in the setting file of Priority B.

For example, in an example shown in FIGS. 7A through 7C, because the setting value of "setting 1" exists in all of setting files shown in FIGS. 7A through 7C, the setting value "100" included in the setting file of the highest priority A is adopted.

In FIG. 6 and FIGS. 7A through 7C, an example is shown in which there are three priorities Priority A through Priority C. Note that the number of priorities can be any number. For example, in the case where there are three priorities Priority A through Priority C as shown in FIG. 6, FIGS. 7A through 7C, it can be assumed that the setting file of Priority A is set by an administrator of an office, the setting file of Priority B is set by a user of the application 21, and the setting file of Priority C is set as an initial setting.

In the case of this kind of priority usage, the setting value set by the administrator of the office is adopted as the highest priority setting. In the case where the setting value set by the administrator of the office does not exist, the setting value of the user of the application is adopted. In the case where neither the setting value set by the administrator of the office nor the setting value set by the user of the application exist, the initial setting value is adopted.

<<Setting Change Process>>

Figure 9:
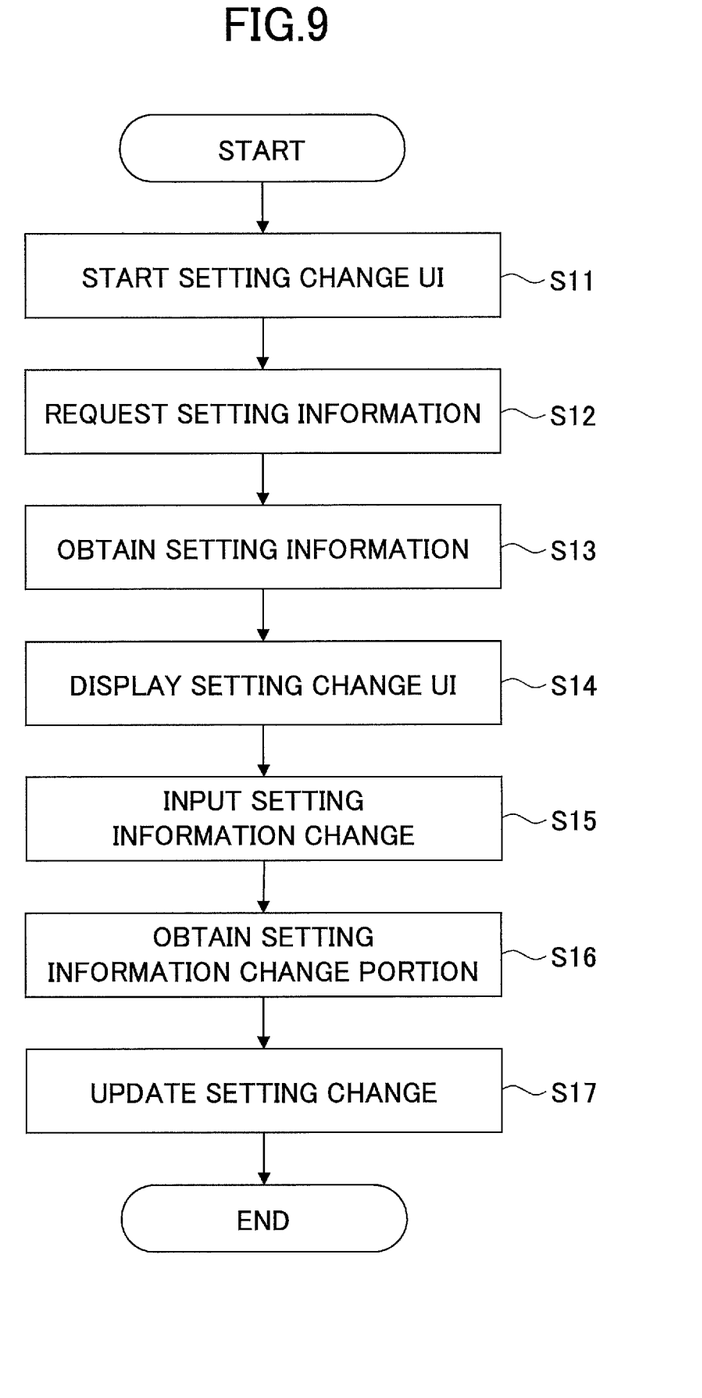
FIG. 9 is a flowchart illustrating a procedure of a setting change process.

FIG. 9 is a flowchart illustrating a procedure of a setting change process. FIG. 9 shows the setting change process in which the user performs the setting change by operating the information processing apparatus 10.

In step S11, the user specifies an application 21 which performs the setting information change by using, for example, the input unit 501, and commands the setting change UI unit 42 to start. In step S12, the application management unit 32 starts the setting change UI unit 42 commanded by the user to start. The setting change UI unit 42 requests the setting information management unit 41 for the setting information of the specified application 21.

In step S13, the setting information management unit 41 obtains the setting information of the specified application 21 from the memory unit 26 and transmits it to the setting change UI unit 42. In step S14, the setting change UI unit 42 displays a setting change screen, which will be described later, based on the setting information transmitted by the setting information management unit 41 on, for example, the display unit 502.

The setting change UI unit 42 has information of the priorities (for example, Priority B) with which the user can change. The setting change UI unit 42 displays the setting change screen in such a way that the user cannot change the setting values set with a priority (for example, Priority A) higher than the priorities with which the user can change the setting value.

In step S15, the user inputs the setting information change in the setting change screen from, for example, the input unit 501. In step S16, the setting change UI unit 42 receives the setting information change from the user and transmits the setting information change to the setting information management unit 41. In step S17, the setting information management unit 41 updates the setting information of the memory unit 26 with the setting information change received from the setting change UI unit 42.

Note that the obtaining of the setting information in step S13 is the same as in the start-up process of the application 21. But the setting information transmitted to the setting change UI unit 42 is different from FIG. 8 and looks something like FIG. 10.

Figure 10:
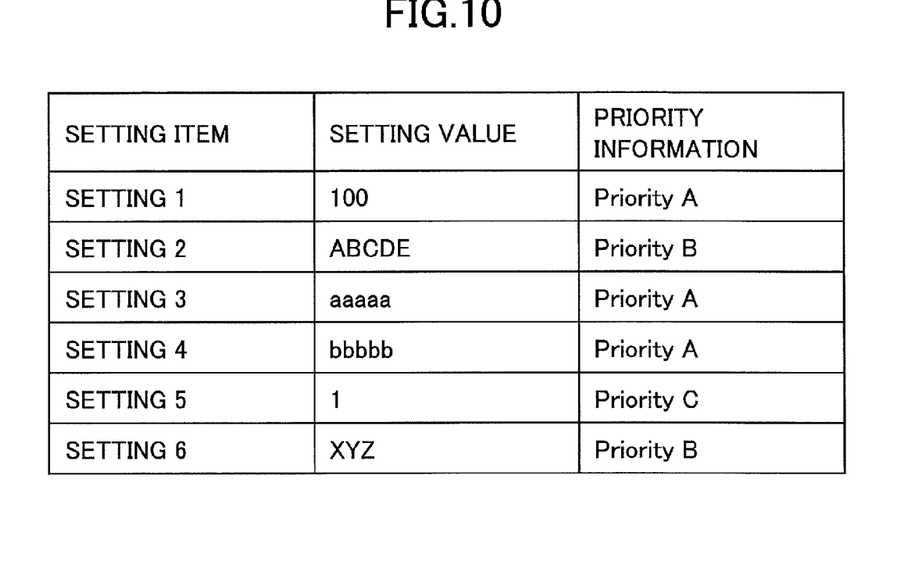
FIG. 10 is a drawing illustrating contents of setting information transmitted to a setting change UI unit.

FIG. 10 is a drawing illustrating the contents of setting information transmitted to the setting change UI unit 42. Regarding the setting information in FIG. 10, information which indicates the priority of the setting (priority information) is added to each of the setting values. For example, in the setting information shown in FIG. 10, the setting values of "setting 1", "setting 3" and "setting 4" are set with Priority A, the setting values of "setting 2" and "setting 6" are set with Priority B, the setting value of "setting 5" is set with Priority C.

Figure 11:
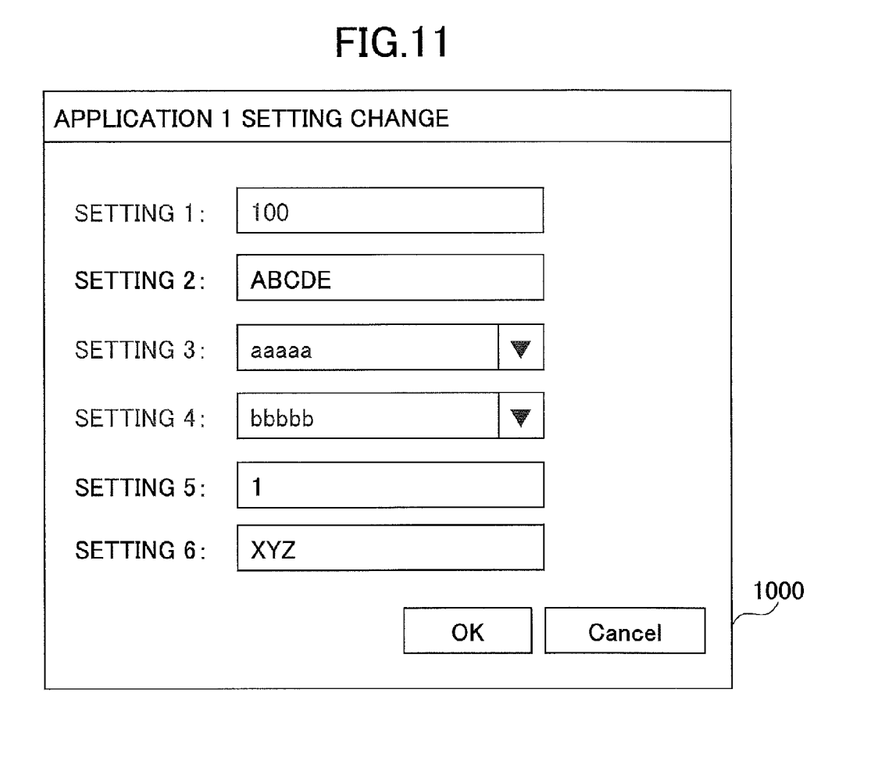
FIG. 11 is a drawing illustrating an image of a setting change screen.

Also, the setting change screen which the setting change UI unit 42 displays in step S14 looks like, for example, FIG. 11. FIG. 11 is a drawing illustrating an image of the setting change screen. In the setting change screen 1000 of FIG. 11, it is assumed that the priority with which the user can change the setting value is Priority B.

The setting change screen 1000 does not allow the setting value changes of "setting 1", "setting 3" and "setting 4", whose setting values are set by the setting file of Priority A. Note that the setting change screen 1000 shows, by displaying characters in grey color, that the setting values of "setting 1", "setting 3" and "setting 4", whose setting values are set by the setting file of Priority A, cannot be changed. The setting change screen 1000 may show that the setting value cannot be changed by indication methods other than displaying characters in grey color.

Figure 12:
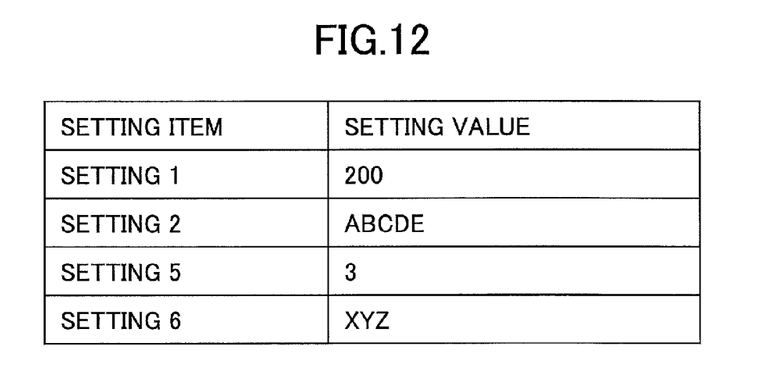
FIG. 12 is a drawing illustrating contents of a setting file of Priority B after the change.

Also, in the case where the setting value of "setting 5" is changed to "3" in the setting change screen 1000 of FIG. 11, in step S17, the setting value of "setting 5" is changed (added) in the setting file of Priority B. In other words, the contents of the setting file of Priority B of FIG. 7B become as shown in FIG. 12. Note that the contents of the setting file of Priority A of FIG. 7A and the contents of the setting file of Priority C of FIG. 7C do not change.

Figure 13:
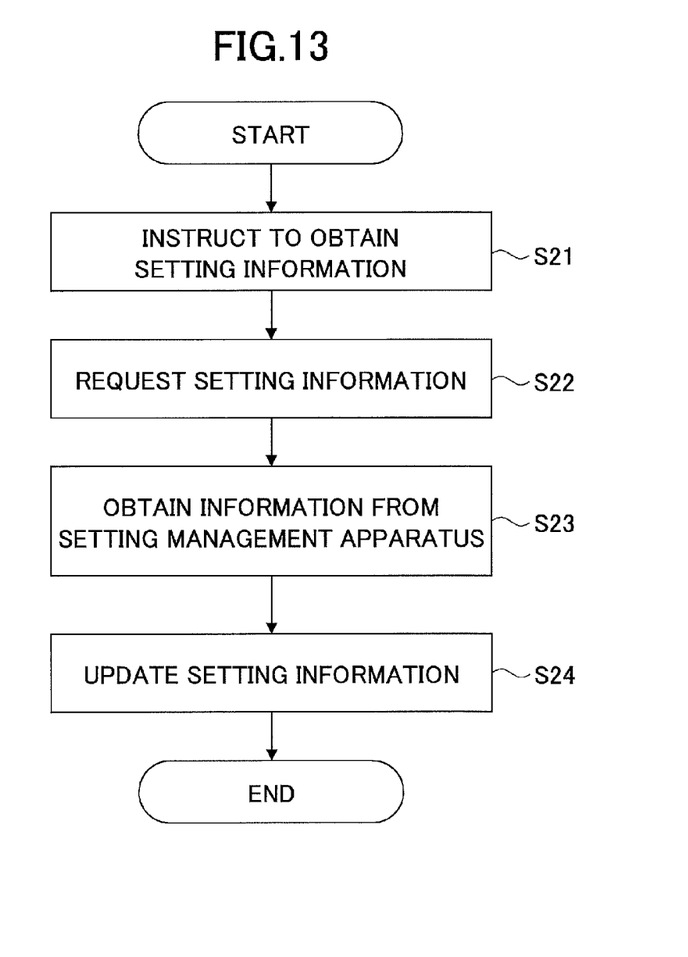
FIG. 13 is a flowchart illustrating another example of the procedure of the setting change process.

FIG. 13 is a flowchart illustrating another example of the procedure of the setting change process. FIG. 13 shows the setting change process in the case where the administrator of the office performs the setting change by using the setting management apparatus 11.

In step S21, the application management unit 32 instructs the setting information management unit 41 of the setting unit 33 to obtain the setting information from the setting management apparatus 11 at a predefined interval or at the time of start-up of the application 21.

In step S22, the setting information management unit 41 requests the setting information receiving unit 43 to obtain the setting information from the setting management apparatus 11. In step S23, the setting information receiving unit 43 accesses a predefined storage location of the setting management apparatus 11, searches for and obtains the setting information. The setting information receiving unit 43 transmits the setting information obtained from the setting management apparatus 11 to the setting information management unit 41. In step S24, the setting information management unit 41 receives the setting information from the setting information receiving unit 43 and updates the setting information stored in the memory unit 26.

Figure 14:
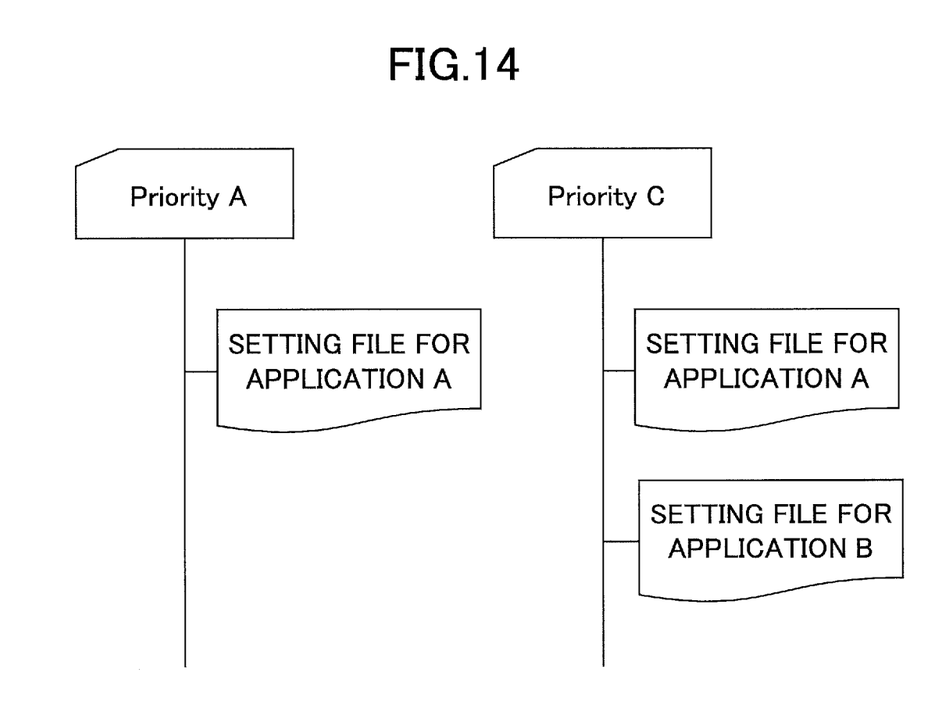
FIG. 14 is a drawing illustrating a configuration example of the setting information stored in a setting management apparatus.

Note that in the setting management apparatus 11, the setting information is stored the same way as is stored by the information processing apparatus 10 as shown in FIG. 14. FIG. 14 is a drawing illustrating a configuration example of the setting information stored in the setting management apparatus 11. The setting information is, for example, created by the administrator of the office and is stored in the setting management apparatus 11 as shown in FIG. 14. Note that the storage format can be any format and the storage location can be any location as long as the information processing apparatus 10 is informed of the format and the location.

In the case where the setting information is stored in the setting management apparatus 11 in the same form as it is stored in the information processing apparatus 10, the setting information management unit 41 updates the setting information by overwriting the setting information stored in the memory unit 26 with the setting information stored in the setting management apparatus 11. Therefore, in the case where setting information doesn't exist in the setting management apparatus 11, the setting information of the information processing apparatus 10 is not overwritten.

For example, in an example of FIG. 14, there is no setting file of Priority B of the application B in the setting management apparatus 11. Therefore, in an example where the setting information stored in the memory unit 26 of the information processing apparatus 10 is as shown in FIG. 6, the setting file of Priority B of the application B is not overwritten.

In the flowchart of FIG. 13, an example is shown in which the setting management apparatus 11 is accessed by the information processing apparatus 10 for obtaining the setting information, but the setting information may be distributed from the setting management apparatus 11 to the information processing apparatus 10. In other words, any method may be used as long as the setting information in the memory unit 26 of the information processing apparatus 10 is updated by the setting information of the setting management apparatus 11.

Although it is not shown in the figures of the present embodiment, a function may be provided in which when the setting information is updated, the information processing apparatus 10 reports the same to the user by displaying the updated information on the display unit 502.

Also, the setting information stored in the memory unit 26 may be prevented from being illegally changed by applying encryption or obfuscation. Regarding the range of the obfuscation of the setting information, for example, the obfuscation may be applied to only the setting information with high priority or to all of the setting information. Note that, in order to prevent the setting file itself from being deleted, the folder in which the high priority setting file of the setting information is stored may be caused to be difficult to be found, or a mechanism may be implemented in which the application 21 will not start when the high priority setting information is deleted.

In the present embodiment, both user convenience and administrative management are achieved by, in the information processing apparatus 10 which starts the application 21, allowing the user and the administrator to be able to set, independently and with different priorities, the setting values which determine the operation of the application 21.

In this way, according to the present embodiment, by causing the priority of the administrator to be higher than the priority of the user, the administrator is able to control the specific process contents of the application 21 of the information processing apparatus 10 as desired. Also, because the user can freely change the setting values which are not set by the administrator, inconvenience is minimized for the user.

The present invention is not limited to the above embodiments, and various variations and modifications may be made without departing from the scope of the present invention. Note that the program management unit in the claims corresponds to the application management unit 32. the setting change receiving unit corresponds to the setting change UI unit 42. The setting information obtaining unit corresponds to the setting information receiving unit 43. the setting information storage apparatus corresponds to the setting management apparatus 11.

The present invention can be implemented in any convenient form, for example using dedicated hardware, or a mixture of dedicated hardware and software. The present invention may be implemented as computer software implemented by one or more networked information processing apparatuses. The network can comprise any conventional terrestrial or wireless communications network, such as the Internet. The information processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD-ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired type of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory of a primary memory of the apparatus, while the HDD may function as a secondary memory of the apparatus.

The present application is based on and claims the benefit of priority of Japanese Priority Application No. 2012-285039 filed on Dec. 27, 2012, with the Japanese Patent Office, the entire contents of which are hereby incorporated by reference.

What is claimed is:

1. An information processing apparatus comprising:
a memory configured to store, in a plurality of storage areas of the memory, a first plurality of setting values associated with setting items for a plurality of programs, each of the plurality of storage areas corresponding to one of a plurality of priority levels; and
a processor configured to,
receive, for at least one of the plurality of programs, corresponding values of the first plurality of setting values from an external apparatus via a network,
store the received values of the first plurality of setting values in the memory, each of the received values being stored in one of the plurality of storage areas based on a priority level associated with each of the received values,
create a second plurality of setting values for the setting items of the at least one of the plurality of programs in response to receiving a start-up request for the at least one of the plurality of programs, the second plurality of setting values being created such that for each setting item of the at least one of the plurality of programs, one of the received values of the first plurality of setting values having a highest priority level among the received values for each setting item is selected as one of the second plurality of setting values;
transmit the created second plurality of setting values to the at least one of the plurality of programs for which the start-up is requested, and
start the at least one of the plurality of programs for which the start-up is requested.

2. The information processing apparatus as claimed in claim 1, wherein the first plurality of setting values are stored in each of plurality of storage areas of the memory based on the priority level associated with each setting item and one of the plurality of programs to which each setting item corresponds.

3. The information processing apparatus as claimed in claim 1, wherein the processor is further configured to,
present the second plurality of setting values to a user by displaying on a display unit the second plurality of setting values,
receive changes to at least one of the second plurality of setting values from the user, and
update ones of the first plurality of setting values corresponding to the at least one of the second plurality of setting values with the received changes.

4. The information processing apparatus as claimed in claim 3, wherein the processor is configured to,
obtain the second plurality of setting values, to each of which a priority level information indicating the associated priority level is added, and
display the second plurality of setting values on the display unit so that the at least one of the second plurality of setting values are presented as being changeable while the remaining ones of the second plurality of setting values are presented as being unchangeable.

5. The information processing apparatus as claimed in claim 1, wherein the processor is further configured to,
obtain a third plurality of setting values with priority levels different from priority levels of the first plurality of setting values, and
update ones of the first plurality of setting values with priority levels indicating that the ones of the first plurality of setting values are not changeable by a user, with the third plurality of setting values.

6. The information processing apparatus as claimed in claim 1, wherein all or a part of the first plurality of setting values stored in the memory are obfuscated.

7. The information processing apparatus as claimed in claim 1, wherein ones of the first plurality of setting values that have a highest level of priority from among the plurality of priority levels, are only changeable by a user with administrative privileges to control the information processing apparatus while the remaining ones of the first plurality of setting values are changeable by the administrator as well as other users with no-administrative privileges.

8. A setting information management method comprising:
receiving, for at least one of a plurality of programs, corresponding values of a first plurality of setting values associated with setting items for the at least one of the plurality of programs from an external apparatus via a network; each of the setting items being associated with at least one of the first plurality of setting values, and each of the first plurality of setting values having one of a plurality of priority levels assigned thereto;
storing the received values of the first plurality of setting values in a memory, each of the received values being stored in one of a plurality of storage areas of the memory based on a priority level associated with each of the received values, each of the plurality of storage areas corresponding to one of the plurality of priority levels;
creating a second plurality of setting values for the setting items of the at least one of the plurality of programs in response to receiving a start-up request for the at least one of the plurality of programs, the second plurality of setting values being created such that for each setting item of the at least one of the plurality of programs, one of the received values of the first plurality of setting values having a highest priority level among the received values for each setting item is selected as one of the second plurality of setting values;
transmitting the created second plurality of setting values to the at least one of the plurality of programs for which the start-up is requested; and
starting the at least one of the plurality of programs for which the start-up is requested.

9. The setting information management method as claimed in claim 8, wherein the first plurality of setting values are stored in each of plurality of storage areas of the memory based on the priority level associated with each setting item and one of the plurality of programs to which each setting item corresponds.

10. The setting information management method as claimed in claim 8, further comprising:
presenting the second plurality of setting values to a user by displaying on a display unit the second plurality of setting values;
receiving changes to at least one of the second plurality of setting values from the user; and
updating ones of the first plurality of setting values corresponding to the at least one of the second plurality of setting values with the received changes.

11. The setting information management method as claimed in claim 10, further comprising:
obtaining the second plurality of setting values, to each of which a priority level information indicating the associated priority level is added; and
displaying the second plurality of setting values on the display unit so that the at least one of the second plurality of setting values are presented as being changeable while the remaining ones of the second plurality of setting values are presented as being unchangeable.

12. The setting information management method as claimed in claim 8, further comprising:

obtaining a third plurality of setting values with priority levels different from priority levels of the first plurality of setting values, and the user priority level from a setting information storage apparatus for storing the third setting values, wherein, in the setting information management step; and updating ones of the first plurality of setting values with priority levels indicating that the ones of the first plurality of setting values are not changeable by a user, with the third plurality of setting values.

13. The setting information management method as claimed in claim 8, wherein all or a part of the first plurality of setting values stored in the memory are obfuscated.

14. The setting information management method as claimed in claim 8, wherein ones of the first plurality of setting values that have a highest level of priority from among the plurality of priority levels, are only changeable by a user with administrative privileges to control the information processing apparatus while the remaining ones of the first plurality of setting values are changeable by the administrator as well as other users with no-administrative privileges.

15. A non-transitory computer-readable recording medium having a computer-readable program product embodied therein, the computer-readable program product comprising instructions, which when executed by a processor, causes the processor to perform functions, including:

receiving, for at least one of a plurality of programs, corresponding values of a first plurality of setting values associated with setting items for the at least one of the plurality of programs from an external apparatus via a network; each of the setting items being associated with at least one of the first plurality of setting values, and each of the first plurality of setting values having one of a plurality of priority levels assigned thereto;

storing the received values of the first plurality of setting values in a memory, each of the received values being stored in one of a plurality of storage areas of the memory based on a priority level associated with each of the received values, each of the plurality of storage areas corresponding to one of the plurality of priority levels;

creating a second plurality of setting values for the setting items of the at least one of the plurality of programs in response to receiving a start-up request for the at least one of the plurality of programs, the second plurality of setting values being created such that for each setting item of the at least one of the plurality of programs, one of the received values of the first plurality of setting values having a highest priority level among the received values for each setting item is selected as one of the second plurality of setting values;

transmitting the created second plurality of setting values to the at least one of the plurality of programs for which the start-up is requested; and starting the at least one of the plurality of programs for which the start-up is requested.

16. The non-transitory computer-readable recording medium as claimed in claim 15, wherein the first plurality of setting values are stored in each of plurality of storage areas of the memory based on the priority level associated with each setting item and one of the plurality of programs to which each setting item corresponds.

17. The non-transitory computer-readable recording medium as claimed in claim 15, further comprising:

presenting the second plurality of setting values to a user by displaying on a display unit the second plurality of setting values;

receiving changes to at least one of the second plurality of setting values from the user; and updating ones of the first plurality of setting values corresponding to the at least one of the second plurality of setting values with the received changes.

18. The non-transitory computer-readable recording medium as claimed in claim 17, further comprising:

obtaining the second plurality of setting values, to each of which a priority level information indicating the associated priority level is added; and displaying the second plurality of setting values on the display unit so that the at least one of the second plurality of setting values are presented as being changeable while the remaining ones of the second plurality of setting values are presented as being unchangeable.

19. The non-transitory computer-readable recording medium as claimed in claim 15, further comprising:

obtaining a third plurality of setting values with priority levels different from priority levels of the first plurality of setting values, and the user priority level from a setting information storage apparatus for storing the third setting values;

updating ones of the first plurality of setting values with priority levels indicating that the ones of the first plurality of setting values are not changeable by a user, with the third plurality of setting values.

20. The non-transitory computer-readable recording medium as claimed in claim 15, wherein all or a part of the first plurality of setting values stored in the memory are obfuscated.

* * * * *